Oct. 9, 1956   S. O. STANFIELD   2,765,687
SINKER APPLYING DEVICE WITH MAGAZINE HANDLE
Filed March 11, 1954
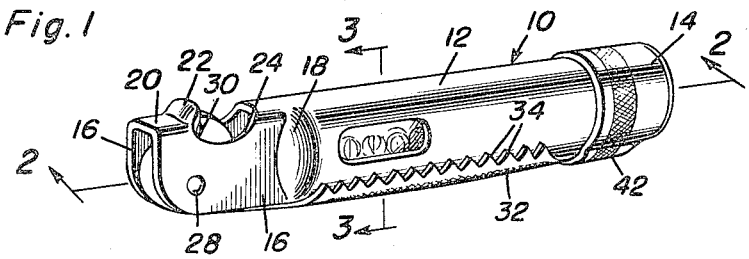
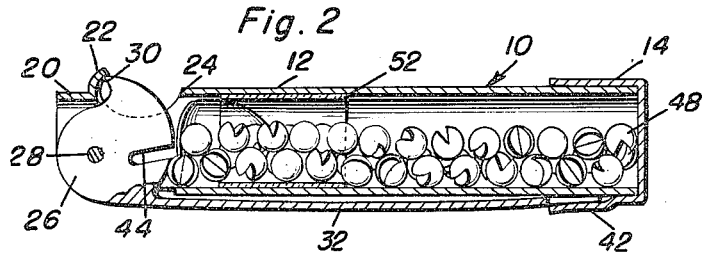 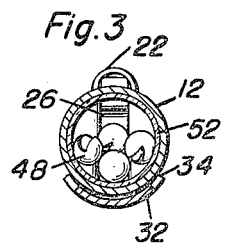
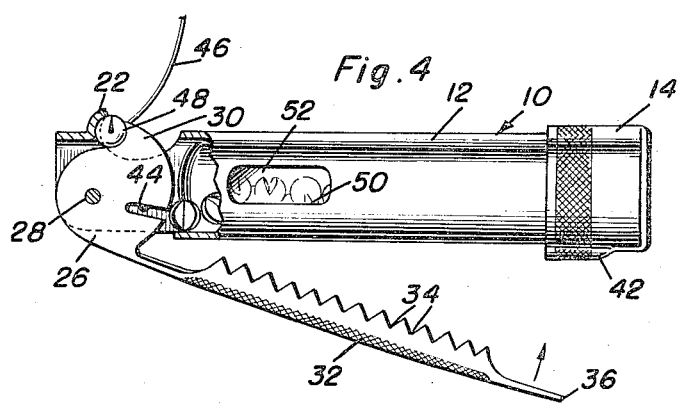 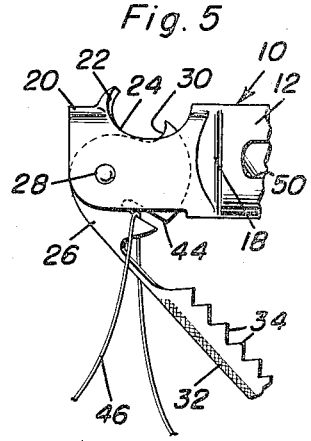
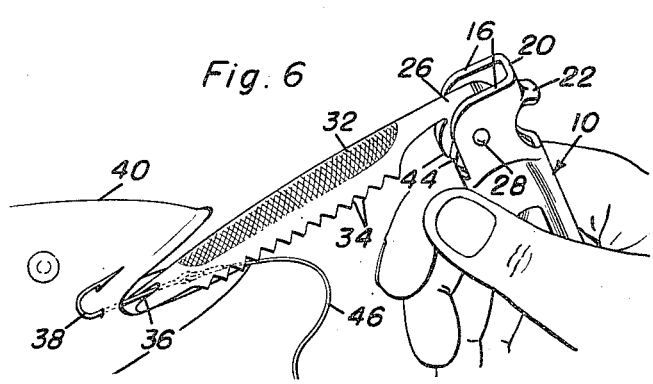
Stephen O. Stanfield
INVENTOR.

United States Patent Office 2,765,687
Patented Oct. 9, 1956

2,765,687

SINKER APPLYING DEVICE WITH MAGAZINE HANDLE

Stephen O. Stanfield, Santa Ana, Calif.

Application March 11, 1954, Serial No. 415,532

2 Claims. (Cl. 81—15)

This invention relates to a sinker applying device, and more specifically, provides a device for securing split shot on a fishing line to act as a sinker or the like.

An object of this invention is to provide a device for applying split shot to a fishing line which is compact, simple in construction, easy to use, well adapted for its purposes and relatively inexpensive to manufacture.

Another object of this invention is to provide a sinker applying device including a tool for applying split shot to a fishing line and a device for cutting the fishing line as well as providing a fish scale remover and a fishing hook removing tool.

Yet another object of this invention is to provide a sinker applying device having a tubular body for receiving a plurality of split shot and a clamping tool for securing the split shot onto a fishing line.

A still further object of this invention is to provide a sinker applying device which may be utilized for a variety of purposes incidental to a fishing operation and which may be easily carried by the fisherman.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the sinker applying device of the present invention;

Figure 2 is a longitudinal, vertical section taken substantially along section line 2—2 of Figure 1 showing the details of construction of the present invention;

Figure 3 is a transverse, vertical section taken substantially along section line 3—3 of Figure 1 showing further structural details of the sinker applying device;

Figure 4 is a side elevational view with portions thereof broken away showing the action of the stationary jaw and the movable jaw for squeezing or applying the split shot to the fishing line;

Figure 5 shows the device utilized for cutting a fishing line; and

Figure 6 is a perspective view showing the handle of the device being utilized for extracting fishing hooks from a fish.

Referring now specifically to the drawings, it will be seen that the sinker applying device of the present invention is generally indicated by the numeral 10 and includes an elongated tubular body 12 having a closure cap 14 closing one end thereof and a pair of integrally formed parallel side members 16 projecting from the other end thereof and including an angulated portion 18 joining the parallel side members 16 to the tubular body 12. At the outer end of the parallel side members 16 is positioned a transverse connecting piece 20 adjacent the upper edge thereof and an upwardly bent portion 22 on the connecting member 20 forms a stationary jaw adjacent a recessed portion 24 in the side member 16 and the connecting piece 20. A plate member 26 is eccentrically and pivotally mounted between the side members 16 on a pivot pin 28 and the plate member 26 includes a generally concave jaw 30 in the form of a ledge which moves with the plate member 26 about the pivot pin 28. A handle 32 projects from one edge of the plate member 26 and is generally semi-circular in longitudinal cross-sectional shape with a plurality of notches 34 along each longitudinal free edge for scraping the scales from a fish in an obvious manner. The remote end of the handle 32 is provided with a split portion 36 for removing a hook 38 from a fish 40, as specifically illustrated in Figure 6. It also will be seen that the closure cap 14 is slidably positioned on the tubular body 12 and includes a recessed portion 42 formed from a bulge in one side of the cap 14 for sliding engagement over the split end 36 of the handle 32, thereby retaining the handle 32 in parallel and closely engaging relation to the tubular body 12. It will be seen that the plate 26 is provided with an inwardly extending slot 44 which is utilized for cutting a fishing line 46 wherein the slot edges 44 cooperate with the edges of the side members 16 thereby cutting the fishing line 46 in an obvious manner. It will be seen that both the stationary jaw 22 and the movable jaw 30 are concave for receiving a split shot 48 for squeezing the split shot 48 onto a fishing line 46. The split shot 48 are positioned inside the tubular body 12 by removing the closure cap 14 in an obvious manner. The plate member 26 pivots about the pivot pin 28, thereby bringing the concave jaw or ledge 30 into communication with the interior of the tubular body 12 wherein a single shot 48 may be positioned on the jaw 30 and moved towards the stationary jaw 22. The fishing line 46 is positioned in the split shot 48 and the handle 32 is manipulated for urging the jaws 30 and 22 together, thereby clamping the split shot 48 around the fishing line 46 thereby forming a sinker. Suitable slots 50 may be provided in the tubular body 12 and a transparent covering material 52 is positioned about the inner periphery of the tubular body 12 for providing a viewing area to determine the number of shot 48 within the tubular body 12. It will be understood that other various tools may be utilized in conjunction with a tool of this nature, and suitable waterproof compartments may be provided for matches or the like, as desired. Obviously, the device may be constructed of any readily obtainable and corrosion resistive material, and the compact arrangement of the device permits easy portability and accessibility by the fisherman, thereby facilitating the entire fishing operation, and especially the positioning of split shot 48 onto a fishing line 46.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A sinker applying device comprising a tubular body terminating in a pair of parallel spaced side members, a plate member pivotally mounted between said side members, a handle secured to said plate member, a movable jaw integral with said plate member, and a stationary jaw on said side members for cooperation with said movable jaw, said movable jaw being in the form of a concave ledge selectively communicating with the interior of the tubular body for receiving a split shot and moving the split shot against the stationary jaw for securing the shot on a line placed into the split thereof.

2. A sinker applying device comprising a tubular body terminating in a pair of parallel spaced side members, a plate member pivotally mounted between said side members, a handle secured to said plate member, a movable jaw integral with said plate member, and a stationary jaw on said side members for cooperation with said movable jaw, said movable jaw being in the form of a concave ledge selectively communicating with the interior of the tubular body for receiving a split shot and moving the split shot against the stationary jaw for securing the shot on a line placed into the split thereof, said tubular member being provided with a removable closure at one end, said closure permitting insertion of split shots into the tubular body and engaging over the end of the handle for retaining the handle against the body when in closed position.

References Cited in the file of this patent

UNITED STATES PATENTS

| | | |
|---|---|---|
| 353,819 | Richards | Dec. 7, 1886 |
| 839,176 | Morris | Dec. 25, 1906 |
| 1,355,465 | Gibbons | Oct. 12, 1920 |
| 2,587,096 | Berger | Feb. 26, 1952 |
| 2,603,992 | Brown et al. | July 22, 1952 |
| 2,629,413 | Stettler | Feb. 24, 1953 |
| 2,651,958 | Deline | Sept. 15, 1953 |